(12) United States Patent
DeCrescentis et al.

(10) Patent No.: US 6,387,199 B1
(45) Date of Patent: May 14, 2002

(54) SEAMED BELT FABRICATION USING CENTRIFUGAL FORCES

(75) Inventors: Antonio DeCrescentis; Ralph A. Mosher, both of Rochester; John S. Berkes, Webster, all of NY (US)

(73) Assignee: Xerox Corporation, Stamford, CT (US)

( * ) Notice: Subject to any disclaimer, the term of this patent is extended or adjusted under 35 U.S.C. 154(b) by 117 days.

(21) Appl. No.: 09/645,268

(22) Filed: Aug. 25, 2000

(51) Int. Cl.[7] .............................................. B32B 31/16
(52) U.S. Cl. .................... 156/74; 156/304.1; 156/304.2
(58) Field of Search ............... 156/74, 304.1, 156/304.2, 451; 428/58

(56) References Cited

U.S. PATENT DOCUMENTS

| | | | | |
|---|---|---|---|---|
| 4,011,120 A | * | 3/1977 | Aggen | 156/74 |
| 4,282,905 A | * | 8/1981 | Dopkin et al. | 138/125 |
| 5,487,707 A | | 1/1996 | Sharf et al. | 474/253 |
| 5,514,436 A | | 5/1996 | Schlueter, Jr. et al. | 428/57 |
| 5,549,193 A | | 8/1996 | Schlueter, Jr. et al. | 198/844.2 |
| 5,721,032 A | | 2/1998 | Parker et al. | 428/57 |

OTHER PUBLICATIONS

USSN 09/460,896, filed Dec. 14, 1999 by Edward L. Schlueter, Jr. et al, entitled Imageable Seam Intermediate Transfer Belt Having an Overcoat.

USSN 09/460,821, filed Dec. 14, 1999 by Gerald M. Fletcher et al, entitled Imageable Seam Intermediate Transfer Belt.

* cited by examiner

*Primary Examiner*—Michael W. Ball
*Assistant Examiner*—John L. Goff
(74) *Attorney, Agent, or Firm*—John M. Kelly; David E. Henn (57) ABSTRACT

Fabricating belts by forcing adhesive into a belt seam using centrifugal forces. A belt having ends that are fabricated to mate along a seam is inserted into a cylinder such that a seam is formed. An adhesive is then deposited along the seam and the cylinder is spun at a speed sufficient to force the adhesive into the seam. The adhesive is then cured so as to produce a seamed belt.

10 Claims, 6 Drawing Sheets

SEAMED BELT FABRICATION USING CENTRIFUGAL FORCES

FIELD OF THE INVENTION

This invention relates to fabricating seamed belts.

BACKGROUND OF THE INVENTION

Electrophotographic printing is a well-known and commonly used method of copying or printing documents. Electrophotographic printing is performed by exposing a light image representation of a desired document onto a substantially uniformly charged photoreceptor. In response to that light image the photoreceptor discharges, creating an electrostatic latent image of the desired document on the photoreceptor's surface. Toner is then deposited onto that latent image, forming a toner image. The toner image is then transferred from the photoreceptor onto a receiving substrate such as a sheet of paper. The transferred toner image is then fused with the substrate, usually using heat and/or pressure. The surface of the photoreceptor is then cleaned of residual developing material and recharged in preparation for the production of another image.

The foregoing generally describes black and white electrophotographic printing machines. Electrophotographic printing can also produce color images by repeating the above process for each color of toner that is used to make the color image. For example, the photoreceptive surface may be exposed to a light image that represents a first color, say black. The resultant electrostatic latent image can then be developed with black toner particles to produce a black toner layer that is subsequently transferred onto a receiving substrate. The process can then be repeated for a second color, say yellow, then for a third color, say magenta, and finally for a fourth color, say cyan. When the toner layers are placed in superimposed registration the desired composite color toner image is formed and fused on the receiving substrate.

The color printing process described above superimposes the color toner layers directly onto a substrate. Other electrophotographic printing systems use intermediate transfer belts. In such systems successive toner layers are electrostatically transferred in superimposed registration from the photoreceptor onto an intermediate transfer belt. Only after the composite toner image is formed on the intermediate transfer belt is that image transferred and fused onto the substrate. Indeed, some electrophotographic printing systems use multiple intermediate transfer belts, transferring toner to and from the various belts as required to fulfill the requirements of the machine's overall architecture.

In operation, an intermediate transfer belt is brought into contact with a toner image-bearing member such as a photoreceptor belt. In the contact zone an electrostatic field generating device such as a corotron, a bias transfer roller, a bias blade, or the like creates electrostatic fields that transfer toner onto the intermediate transfer belt. Subsequently, the intermediate transfer belt is brought into contact with a receiver. A similar electrostatic field generating device then transfers toner from the intermediate transfer belt to the receiver. Depending on the system, a receiver can be another intermediate transfer member or a substrate onto which the toner will eventually be fixed. In either case the control of the electrostatic fields in and near the transfer zone is a significant factor in toner transfer.

Intermediate transfer belts often take the form of seamed belts fabricated by fastening two ends of a web material together, such as by welding, sewing, wiring, stapling, or gluing. While seamless intermediate transfer belts are possible, they require manufacturing processes that make them much more expensive than similar seamed intermediate transfer belts. This is particularly true when the intermediate transfer belt is long. While seamed intermediate transfer belts are relatively low in cost, the seam introduces a discontinuity that interferes with the electrical, thermal, and mechanical properties of the belt. While it is possible to synchronize a printer's operation with the motion of the intermediate transfer belt so that toner is not electrostatically transferred onto the seam, such synchronization adds to the printer's expense and complexity, resulting in loss of productivity. Additionally, since high speed electrophotographic printers typically produce images on paper sheets that are cut from a paper "web," if the seam is avoided the resulting unused portion of the paper web must be cut-out, producing waste. Furthermore, even with synchronization the mechanical problems related to the discontinuity, such as excessive cleaner wear and mechanical vibrations, still exist. However, because of the numerous difficulties with transferring toner onto and off of a seamed intermediate transfer belt in the prior art it was necessary to avoid toner transfer onto (and thus off of) a seam.

Acceptable seamed intermediate transfer belts require sufficient seam strength to achieve a desired operating life. While that life depends on the specific application, typically it will be at least 100,000 operating cycles, but more preferably 1,000,000 cycles. Considering that a seamed intermediate transfer belt suffers mechanical stresses from belt tension, traveling over rollers, moving through transfer nips, and passing through cleaning systems, achieving such a long operating life is not trivial. Thus the conflicting constraints of long life and limited topographical size at the seam places a premium on adhesive strength and good seam construction.

A prior art "puzzle-cut" approach to seamed belts significantly improves the seam's mechanical strength. U.S. Pat. No. 5,514,436, issued May 7, 1996, entitled, "Puzzle Cut Seamed Belt;" U.S. Pat. No. 5,549,193 entitled "Endless Seamed Belt with Low Thickness Differential Between the Seam and the Rest of the Belt;" and U.S. Pat. No. 5,487,707, issued Jan. 30, 1996, entitled "Puzzle Cut Seamed Belt With Bonding Between Adjacent Surface By UV Cured Adhesive" teach the puzzle-cut approach. While the puzzle-cuts described in the forgoing patents beneficially improve the seam's strength, further improvements would be beneficial. Furthermore, there are other difficulties when transferring toner onto and off of a seam of a seamed intermediate transfer belt.

Imageable seam intermediate transfer belts are highly desirable. For an imageable seam intermediate transfer belt to be acceptable, the final image produced from across the seam region must be comparable in quality to images formed across the remainder of the belt. This is a difficult task due to a number of interrelated factors. Some of those factors relate to the fact that the seam should not greatly impact the electrostatic fields used to transfer toner. However, electrostatic transfer fields are themselves dependent on the electrical properties of the intermediate transfer belt. While this dependency is complex, briefly there are conditions where transfer fields are very sensitive to the resistivity and thickness of the materials used for the various layers of the intermediate transfer belt. Under other conditions the electrostatic transfer fields are relatively insensitive to those factors. Similarly, there are conditions where the electrostatic transfer fields are very sensitive to the dielectric constants of the materials used for the layers of the intermediate transfer belt, and other conditions where the electrostatic transfer fields are insensitive to the dielectric constants. Therefore, to successfully transfer toner onto and off of a seamed intermediate transfer belt the electrical properties across and around the seam should be carefully controlled to produce a proper relationship with the remainder of the belt. Since the electrical properties depend on the interrelated factors of seam geometry, seam construction (such as adhesive beyond the seam), seam topology, seam thickness, the presence of an overcoating, and various other factors those factors should be taken into consideration for a given application.

In addition to mechanical strength and electrical compatibility difficulties, there are other problems when transferring toner onto and off of a seam. For example, with most prior art seamed intermediate transfer belts relatively poor cleaning around the seam was acceptable. However, if toner is being transferred onto and off of the seam region the seam must be properly cleaned. Thus, the toner release and friction properties across the seam region have to be comparable to those of the rest of the belt. Furthermore, most prior art seamed intermediate transfer belts have a significant "step" where the belt overlaps to form the seam. That step can be as large as 25 microns. Such a step significantly interferes with transfer and cleaning. Thus if toner is transferred onto and off of the seam, the seam's friction, toner release, and topography are much more constrained than those of other seamed intermediate transfer belts. Furthermore, while the step of a puzzle-cut seamed belts is relatively small, belt tension can cause individual puzzle-cut petal to separate and lift from around neighboring petal. Such lifting introduces localized steps that interfere with blade-based belt cleaners. Such interference can seriously degrade belt and cleaner blade life.

More information regarding the requirements of imageable seam intermediate transfer belts can be found in U.S. patent application Ser. No. 09/460,896, now U.S. Pat. No. 6,245,402 entitled, "IMAGEABLE SEAM INTERMEDIATE TRANSFER BELT HAVING AN OVERCOAT," inventors Edward L. Schlueter, Jr. et al., and U.S. patent application Ser. No. 09/460,821, now U.S. Pat. No. 6,261,659 entitled, "IMAGEABLE SEAM INTERMEDIATE TRANSFER BELT," inventors Gerald M. Fletcher et al., both filed on Dec. 14, 1999. Those patent documents discuss, among other things, "short-wavelength" and "long-wavelength" spatial disturbances, conformable overcoats, Paschen air breakdown, transfer nip air gaps, suitable electrical properties, material layers, material compositions, environmental and aging concerns, cleaning, surface friction, and "set point control" approaches to enable wider tolerances in electrical properties.

From above it can be seen that a seam's topography is very important if one wants to transfer toner onto and off of a seam region without significant degradation of the final image. The seam topography includes not only the seam itself, but also any overflow of the adhesive used in the seam. This overflow can occur on both the toner-bearing side and the back-side of the belt. Adhesive overflow is important because the belt seam strength can depend on that overflow. However, excessive overflow increases various mechanical, electrical, and xerographic problems. Furthermore, the adhesive's electrical properties remain important.

While overflow is an important consideration, another consideration is underflow. Underflow relates to poor filling of the adhesive into the seam joint. Underflow result is bubbles or voids that weaken the seam and that create electrostatic and friction problems. While some adhesives have low viscosity and surface energy characteristics that enable the adhesive to readily wick into the seam, such adhesives tend to increase overflow problems. Other adhesives have higher viscosity and less wicking, but are relatively difficult to force into a seam.

Prior art manufacturing of puzzle-cut seamed belts was relatively slow. First, puzzle-cut ends were produced on a belt using by stamping the belt with a puzzle-cut die-set or by cutting with a laser. Then, the puzzle-cut ends were interlocked to form a seam. The puzzle-cut seam was then placed on a flat surface, which might have included a tape to temporarily hold the puzzle-cut seam together and to prevent tab lifting. An adhesive was then forced into the backside of the seam using a roller or brush, with the flat surface acting to reduce overflow. That adhesive was then cured, and the overflow on the inner surface of the belt was reduced to an acceptable level by sanding, lapping and/or polishing. The seamed belt was then removed from the flat bed (and tape) and the outer seam surface was sanded and polished as required. While the prior art method is useful for producing puzzle-cut belts, it is probably too slow and complex for high-speed production of seamed belts. One significant difficulty is applying the adhesive to the seam. Generally, an excessive amount of adhesive must be placed over the backside of the seam to reduce underfill. While this reduces underfill, the excess adhesive eventually has to be removed. This can be difficult and time-consuming to do. Therefore, a new method of forcing adhesive into a belt seam would be beneficial. Even more beneficial would be a method of forcing adhesive into a seam quickly and economically. Particularly beneficial would be a technique suitable for quickly and economically fabricating strong, puzzle-cut imageable seam intermediate transfer belts.

SUMMARY OF THE INVENTION

The principles of the present invention provide for fabricating belts by applying adhesive to a belt seam using centrifugal forces. Those principles are beneficial for fabricating puzzle-cut belts, including imageable seam intermediate transfer belts. A belt fabrication method according to the principles of the present invention includes obtaining a belt having two ends that are fabricated to mate with each other so as to produce a seam. That belt is then inserted into a cylinder such that the two ends form a seam. An adhesive is then deposited along the seam and the cylinder is spun at a speed sufficient to produce centrifugal forces that force the adhesive into the seam. The adhesive is then cured, possibly using heat or ultraviolet rays, so as to produce a seamed belt. Excess adhesive is then removed as required.

BRIEF DESCRIPTION OF THE DRAWINGS

Other features of the present invention will become apparent as the following description proceeds and upon reference to the drawings, in which.

DETAILED DESCRIPTION OF THE INVENTION

While the principles of the present invention are described below in connection with a puzzle-cut, imageable seam intermediate transfer belt that is fabricated using centrifugal forces to force adhesive into a seam, it should be understood that the present invention is not limited to that particular belt. In general, the principles of the present invention may be found useful in fabricating numerous other types of belts. Therefore, the present invention is intended to cover all alternatives, modifications, and equivalents as may be included within the spirit and scope of the appended claims.

Figure 1:
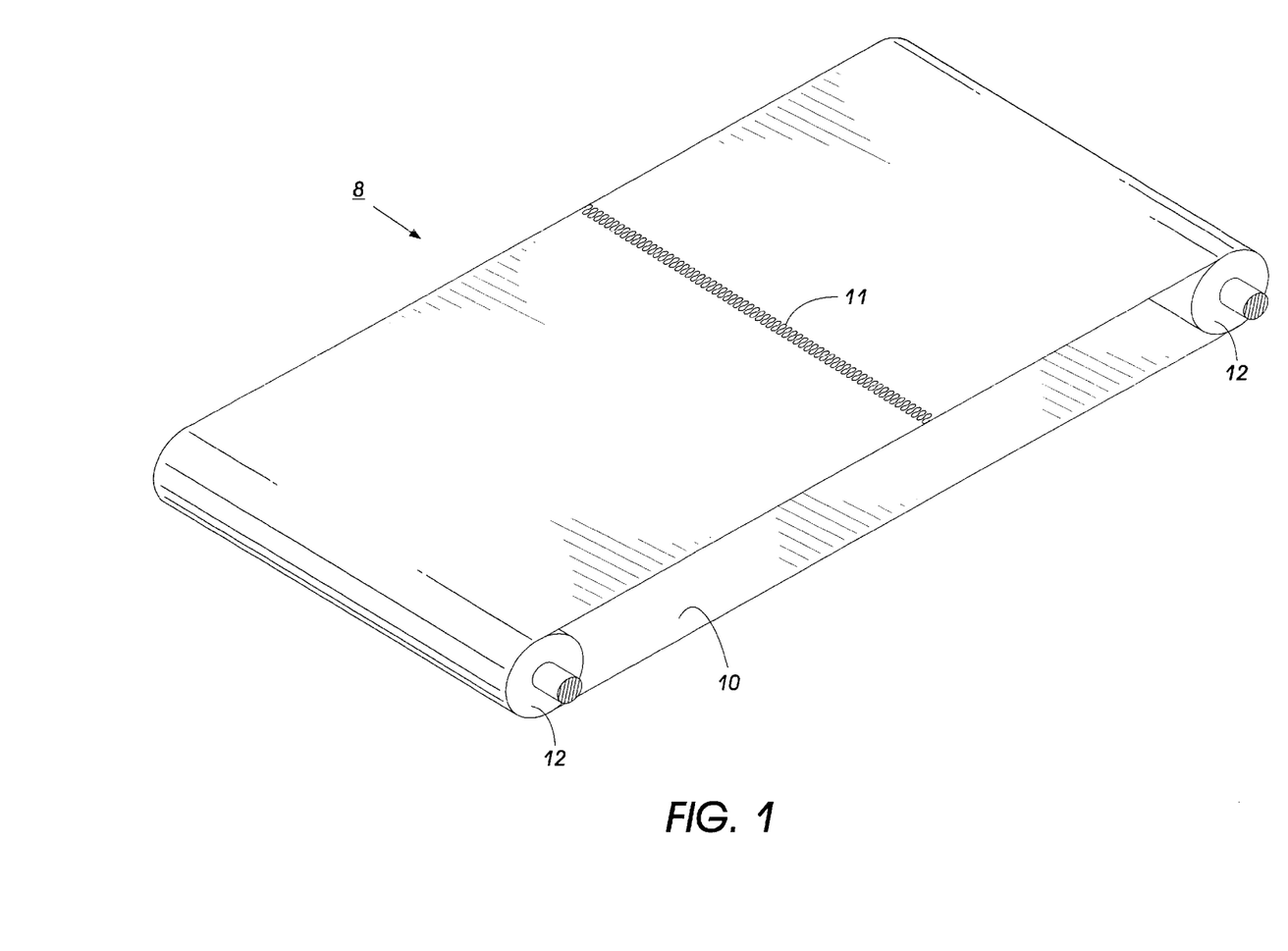
FIG. 1 is an isometric representation of a puzzle-cut seamed intermediate transfer belt.

An imageable seam intermediate transfer belt 8 is illustrated in FIG. 1. That belt includes a semiconductive substrate layer 10 that has its ends joined together to form a continuous belt using mechanically interlocking "puzzle-cut" tabs that form a seam 11. While the seam is illustrated as being perpendicular to the two parallel sides of the substrate layer the seam could be angled or slanted with respect to the parallel sides. Reference U.S. Pat. Nos. 5,487,707; 5,514,436; 5,549,193; and 5,721,032 for additional information on puzzle-cut patterns. Typically the seam 11 is about ¼ inch wide.

The substrate layer 10 can be made from a number of different materials, including polyesters, polyurethanes, polyamides, polyvinyl chlorides, polyolefins (such as polyethylene and polypropylene) and/or polyamides (such as nylon, polycarbonates, or acrylics). If required, the selected material is modified by the addition of an appropriate filler such that the substrate layer has a desired electrical conductivity. Appropriate fillers can include for example carbon, Accuflor carbon, and/or polyanaline. The substrate layer material should have the physical characteristics appropriate to an intermediate transfer application, including good tensile strength (Young's modulus, typically $1 \times 10^3$ to $1 \times 10^6$ newtons/m$^2$, resistivity (typically less than $10^{13}$ ohm cm volume resistivity, greater than $10^8$ ohms/square lateral resistivity), thermal conductivity, thermal stability, flex strength, and high temperature longevity. See, the previously referenced U.S. patent applications, Ser. No. 09/460,896, now U.S. Pat. No. 6,245,402, entitled "Imageable Seam Intermediate Transfer Belt Having An Overcoat," inventors Edward L. Schlueter, Jr. et al., and Ser. No. 09/460,821, now U.S. Pat. No. 6,261,659, entitled "Imageable Seam Intermediate Transfer Belt," inventors Gerald M. Fletcher et al., both filed on Dec. 14, 1999.

Figure 2:
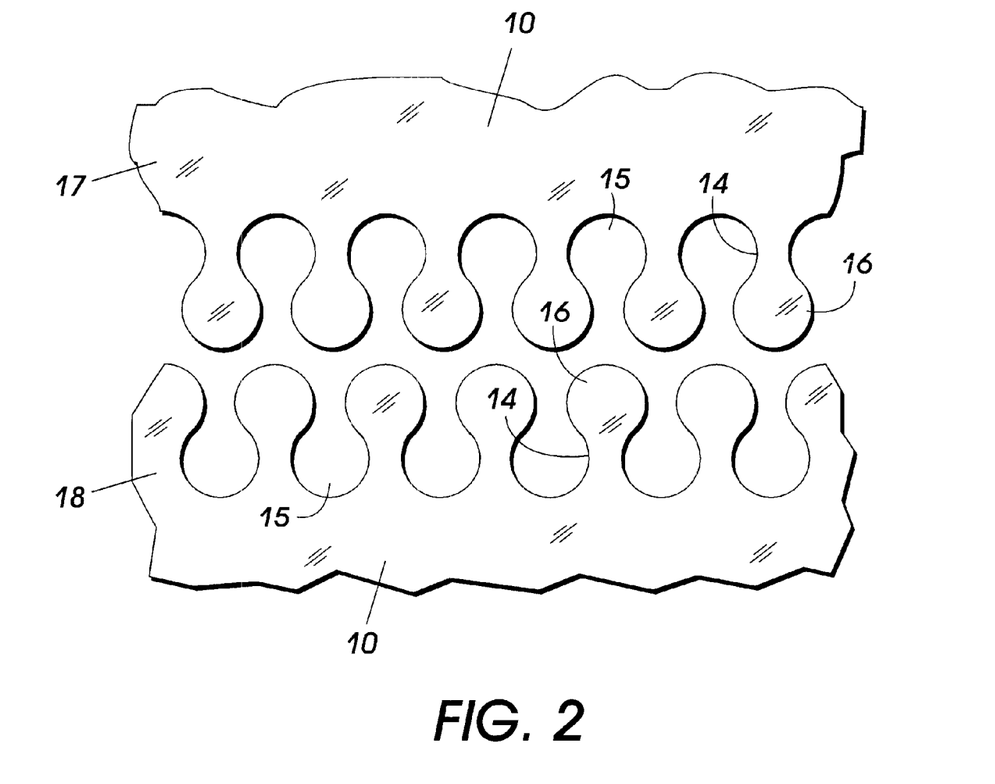
FIG. 2 is a top down view of the puzzle-cut tab pattern used in the belt of FIG. 1.

FIG. 2 shows a top view of the puzzle-cut tab pattern in more detail. Each end of the belt, the ends 17 and 18, are fabricated with tabs. Each tab is comprised of a neck 14 and a node 16 that fit into female 15 interlocking portions. The tabs are beneficially formed using either a punch die-set or a laser micro-machining system. The interlocking tabs mate so as to reduce the stress concentration between the interlocking elements and to permit easy travel around curved members, such as rollers 12 shown in FIG. 1.

Figure 3:
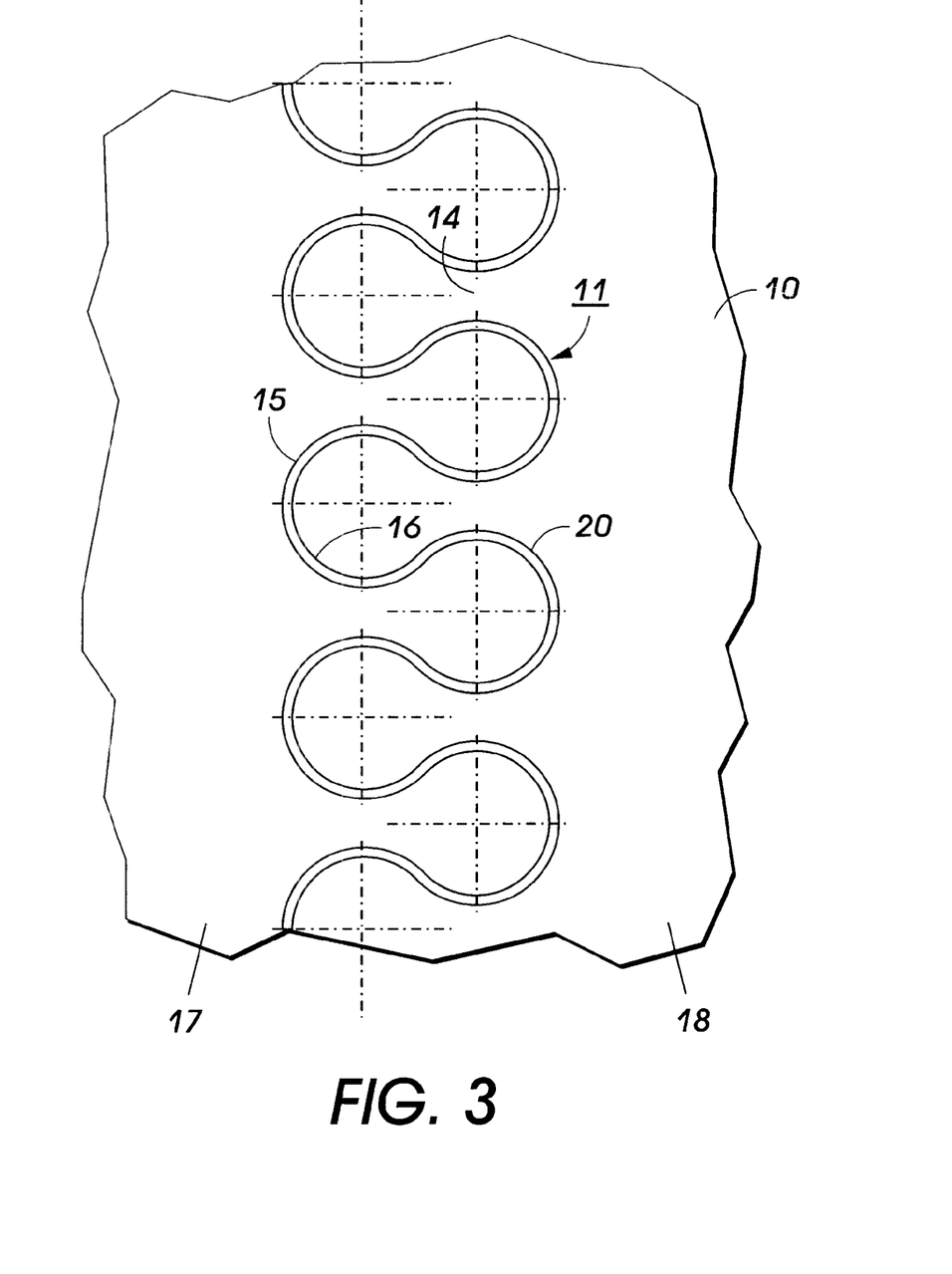
FIG. 3 shows the puzzle-cut tabs of FIG. 2 interlocked together.
Figure 4:
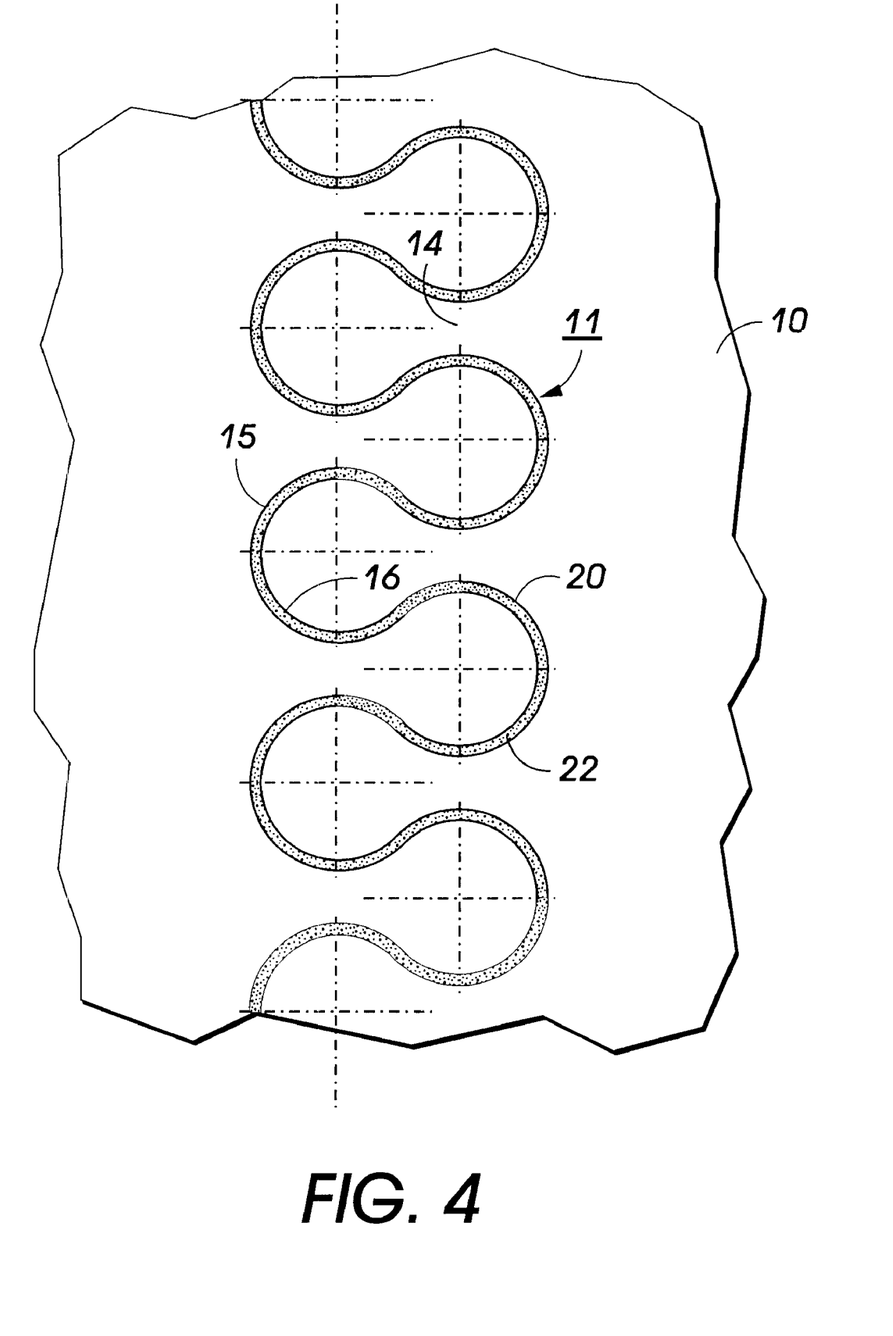
FIG. 4 shows the puzzle-cut tabs of FIG. 3 with the kerf filled with an adhesive.

FIG. 3 shows a top view of the ends 17 and 18 mated after the puzzle-cut tabs interlocked together. Physically interlocking the puzzle-cut tabs may require pressure when mating. Interlocking produces a gap between the mutually mating elements that is called a kerf 20. As shown in FIG. 4 the interlocking tabs are held together using an adhesive 22 that fills the kerf. The adhesive is designed to be physically, chemically, thermally, mechanically, and electrically compatible with the substrate layer material. Seams with a 25 micron kerf have been typical for the puzzle-cut seam while a kerf less than about 5 microns can be preferred.

Significantly, the adhesive and the puzzle-cut tabs act together to create a strong seam. The adhesive may overfill the seam itself, thereby providing additional seam strength. Ideally the seam should be strong, smooth, and mechanically uniform. The surface energy of the adhesive should be compatible with the substrate layer material such that the adhesive adequately wets and spreads. Furthermore, the adhesive should remain flexible and should adhere well to the substrate layer material. Finally, the adhesive also should have low shrinkage during curing. As an example, the adhesive can be a hot melt adhesive that is heated and pressed into the seam such that the adhesive is flattened, making it as mechanically uniform as possible with the substrate layer 10. Alternatively, the adhesive can be an epoxy-like material, an UV curable adhesives including acrylic epoxies, polyvinyl butyrals, or the like.

As the illustrated embodiment belt is an imageable seam intermediate transfer belt, the electrical properties of the adhesive and the substrate are very important since they significantly affect the transfer characteristics of the resulting seam as compared to the transfer characteristics of the rest of the belt. Therefore, the adhesive should produce a seam that has electrical properties that corresponds to that of the substrate layer. That is, under operating conditions a seam should create an electrostatic transfer field in the toner transfer zones that is within at least 20%, preferably within 10%, of the electrostatic transfer field that is present for the remainder of the belt. Ideally the seam electrical properties are substantially the same as the substrate layer and have substantially the same electrical property dependence as the substrate on all important factors, such environment, applied field, and aging. However, significant differences in electrical properties can be allowed for some imageable seam conditions as discussed subsequently. The adhesive electrical properties can be met by mixing fillers or additives with an adhesive. For example, an adhesive might contain silver, indium tin oxide, CuI, SnO2, TCNQ, Quinoline, carbon black, NiO and/or ionic complexes such as quaternary ammonium salts, metal oxides, graphite, or like conductive fillers.

Figure 5:
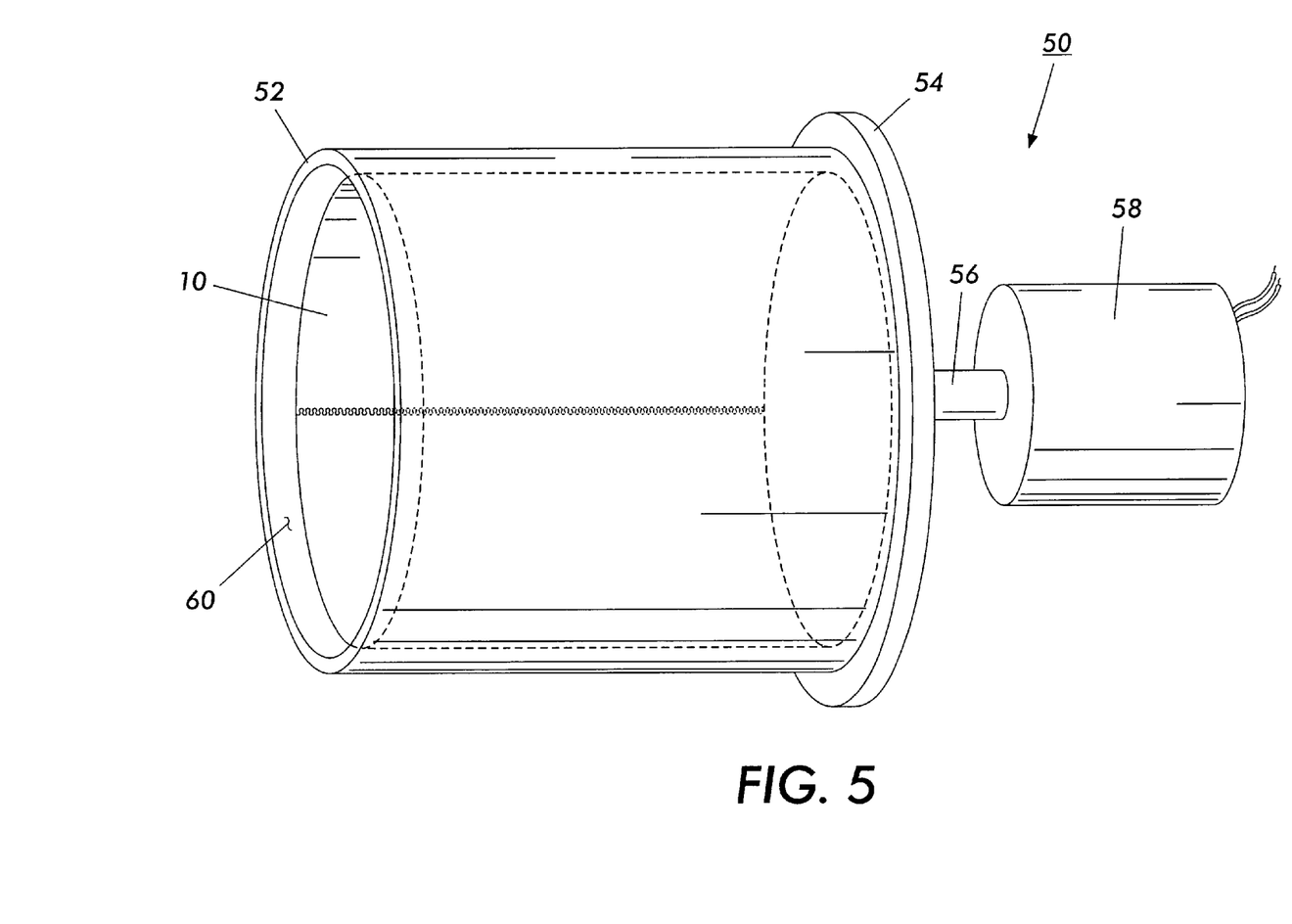
FIG. 5 shows a puzzle-cut belt having interlocked ends that is inside a motor-driven, rotatable cylinder.

The principles of the present invention are specifically related to applying the adhesive 22 to the seam. FIG. 5 shows an apparatus 50 that is useful in practicing the present invention. That apparatus includes a cylinder 52 that is mounted on a plate 54. That plate is attached via a shaft 56 to a motor 58. The cylinder 52 has an inner surface 60 that defines an internal dimension that matches the outer width of an imageable seam intermediate transfer belt substrate 10 having its ends 17 and 18 interlocked to form a seam (reference FIGS. 1 and 3). Such a substrate is then placed inside the cylinder.

Figure 6:
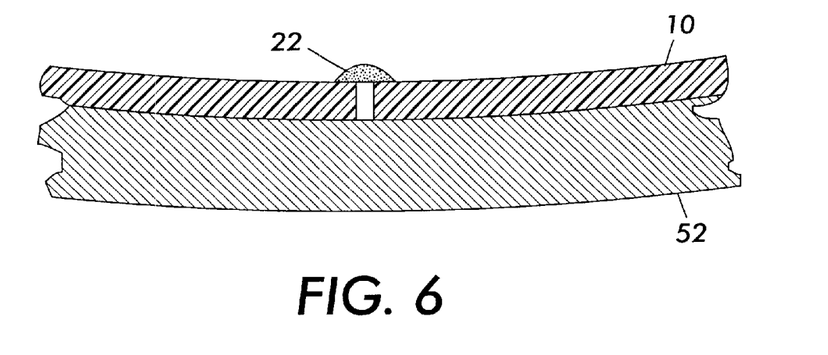
FIG. 6 shows a cross-sectional view of adhesive on the interlocked seams of the belt in FIG. 5.
Figure 7:
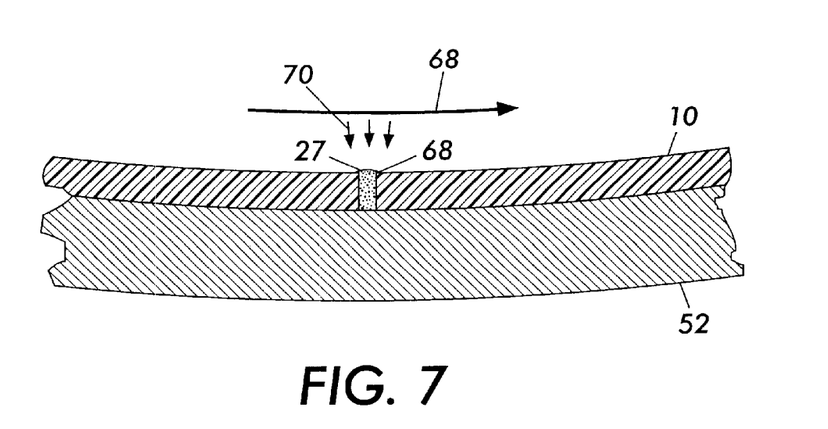
FIG. 7 shows a cross-sectional view of the seam in FIG. 6 after the cylinder is rotated fast enough to produce centrifugal forces that force the adhesive into the seam.

Referring now to FIG. 6, with a substrate 10 inside the cylinder 52, an adhesive 22 is deposited on the inner surface of the seam. Referring now to FIGS. 5 and 7, the motor 58 then rotates the plate 54, the cylinder 52, and the substrate 10 in a direction 68. The rotation is sufficiently fast that the resulting centrifugal forces 70 force the adhesive 22 into the kerf 20. The required rotational velocity will depend upon the numerous factors, including the viscosity of the adhesive that is used, the size of the kerf 20, and the surface interactions between adhesive and the substrate.

After forcing the adhesive into the kerf, the adhesive is suitably cured and the resulting seamed belt is removed from the cylinder 52. Excess adhesive is then removed using a suitable technique such as sanding, polishing, or buffing. Finally, if required, an overcoat can be placed on the seamed belt.

While this invention has been described in conjunction with an imageable seam intermediate transfer belt, it is evident that other belts may benefit from the principles of the present invention. Furthermore, there are numerous alternatives, modifications, and variations to the foregoing that will be apparent to those skilled in the art. Accordingly, the present invention is intended to embrace all alternatives, modifications and variations that fall within the spirit and scope of the appended claims.

We claim:

1. A method of fabricating a seamed belt comprising the steps of:
   providing a substrate sheet having unmarked ends;
   mating said ends to form a seam;
   locating said substrate with said seam in a cylinder;
   depositing adhesive on said seam;
   rotating said cylinder so as to produce centrifugal forces that force said adhesive into said seam; and
   curing said adhesive to form a seamed belt.

2. The method of fabricating a seamed belt according to claim 1, further including the step of removing excessive adhesive from said seam.

3. The method of fabricating a seamed belt according to claim 2, wherein said step of removing excessive adhesive is performed by sanding.

4. The method of fabricating a seamed belt according to claim 1, wherein said step of providing a substrate sheet having a unmated ends includes the step of fabricating puzzle-cut tabs on each end.

5. The method of fabricating a seamed belt according to claim 4, wherein said step of mating said ends includes the step of interlocking said puzzle-cut tabs.

6. A method of fabricating an imageable seam intermediate transfer belt comprising the steps of:
   providing a semiconductive substrate sheet having unmated ends, wherein said semiconductive substrate has electrical and frictional properties;
   mating said ends to form a seam;
   locating said semiconductive substrate with said seam in a cylinder;
   depositing an adhesive on said seam, wherein said adhesive has electrical and frictional properties substantially similar to said electrical and frictional properties of said semiconductive substrate;
   rotating said cylinder so as to produce centrifugal forces that force said adhesive into said seam; and
   curing said adhesive to form a seamed belt.

7. The method of fabricating an imageable seam intermediate transfer belt according to claim 6, further including the step of removing excessive adhesive from said seam.

8. The method of fabricating an imageable seam intermediate transfer belt according to claim 7, wherein said step of removing excessive adhesive is performed by sanding.

9. The method of fabricating an imageable seam intermediate transfer belt according to claim 8, wherein said step of providing a semiconductive substrate sheet having unmated ends includes the step of fabricating puzzle-cut tabs on each end.

10. The method of fabricating an imageable seam intermediate transfer belt according to claim 9, wherein said step of mating said ends includes the step of interlocking said puzzle-cut tabs.

\* \* \* \* \*